United States Patent [19]

Volkmar

[11] Patent Number: 5,450,736
[45] Date of Patent: Sep. 19, 1995

[54] PORTABLE STEERING WHEEL GRIPPER

[76] Inventor: Nathan Volkmar, 300 Central Park W., Apt. 3F, New York, N.Y. 10024

[21] Appl. No.: 166,783

[22] Filed: Dec. 13, 1993

[51] Int. Cl.⁶ .............................................. B60R 25/02
[52] U.S. Cl. ........................................ 70/209; 70/226; 70/238
[58] Field of Search ................... 70/209–212, 70/225, 226, 237, 238; 74/552, 558

[56] References Cited

U.S. PATENT DOCUMENTS

| | | | |
|---|---|---|---|
| 1,154,389 | 9/1915 | Fogalsang . | |
| 1,329,913 | 2/1920 | McGuire | 70/209 X |
| 1,347,463 | 7/1920 | Jameson . | |
| 1,368,054 | 2/1921 | Recher | 70/212 |
| 1,395,532 | 11/1921 | Tilden | 70/209 X |
| 1,429,334 | 9/1922 | Furber . | |
| 1,812,697 | 6/1931 | Hatfield | 70/258 |
| 3,815,391 | 6/1974 | Latta | 70/209 |
| 3,828,593 | 8/1974 | Bolton | 70/209 |
| 3,982,602 | 9/1976 | Gorman . | |
| 4,008,589 | 2/1977 | Harrell | 70/237 X |
| 4,494,391 | 1/1985 | Solow | 70/237 X |
| 4,715,783 | 12/1987 | Wade | 70/232 X |
| 4,823,733 | 4/1989 | Latta | 70/209 |
| 4,961,331 | 10/1990 | Winner | 70/209 |
| 5,031,429 | 7/1991 | Wang | 70/209 |
| 5,055,823 | 10/1991 | Fuller | 70/209 |
| 5,095,723 | 3/1992 | Lin | 70/209 |

FOREIGN PATENT DOCUMENTS

| | | | |
|---|---|---|---|
| 004211 | 3/1992 | WIPO | 70/209 |

*Primary Examiner*—Peter M. Cuomo
*Assistant Examiner*—Suzanne L. Dino
*Attorney, Agent, or Firm*—Anderson Kill Olick & Oshinsky

[57] ABSTRACT

A steering wheel gripper for preventing unauthorized steering of a motor vehicle, generally including and a flexible, multi-link member circumscribing the rim of a steering wheel along substantially the entire perimeter of the rim, formed of separate hollow links having an arcuate cross-section corresponding to the rim cross-section, made of a rigid, hard-to-sever material and pivotally connected in series to one another and, an elongate member fixedly connected to a middle link tangentially thereto and extending in the longitudinal direction of the middle link.

5 Claims, 2 Drawing Sheets

PORTABLE STEERING WHEEL GRIPPER

FIELD OF THE INVENTION

The present invention relates to anti-theft devices for motor vehicles and, more particularly to anti-theft devices which prevent rotation of the steering wheels of a motor vehicle.

BACKGROUND OF THE INVENTION

A large number of portable steering wheel constraining devices which prevent unauthorized steering of the vehicle are known. These devices or, as they are sometimes called, steering wheel locks, are increasingly popular because they are relatively easy to install, relatively inexpensive, and require increased time and effort by a thief to steal the vehicle.

However, such steering wheel locks can and often are broken, cut or otherwise removed. Such steering wheel locks are shown, for example, in U.S. Pat. Nos. 1,154,389 (Fogalsang), 3,982,602 (Gorman), 4,738,127 (Johnson), 4,961,333 (Winner) and 5,095,723 (Lin). All of these devices have the same or other drawbacks.

The Fogelsang patent discloses a steering wheel lock or guard formed of two semicircular metal sections hinged at their one ends and connected with a lock at their other ends. The guard is mounted on the wheel with a clearance such that it can rotate freely relative to the steering wheel so that the steering of the wheel is impossible. However, the guard of U.S. Pat. No. 1,154,389 is rather cumbersome and is not clearly visible from outside of the vehicle so that it does not warn a would be thief that the vehicle would be difficult to steal.

Another type of a steering wheel lock is disclosed in the Gorman patent. The Gorman lock is formed as a housing with a generally truncated conical configuration. The housing, as shown in U.S. Pat. No. 3,982,602, is formed of two halves which, at a smaller end of the cone, form a collar surrounding the steering shaft. The two housing parts carry complementary shapes for securing the housing about the steering wheel and the steering shaft. Again, this lock is rather cumbersome, not clearly visible from outside.

The Winner and Lin patents disclose so-called "club"-type steering wheel locks, which includes an elongate body extending beyond the steering wheel circumference and which prevents steering of the wheel by hitting the windshield, the vehicle door, or another obstacle. However cutting through the steering wheel could facilitate removal of the club and, thereafter, theft of the vehicle.

Another type of steering wheel lock, which is not mounted on the steering wheel is disclosed in the U.S. Pat. No. 4,961,331. The lock of U.S. Pat. No. 4,961,331 is formed of two tubular telescopic members having a hook at one of their respective ends for connecting the steering wheel to the brake pedal. The lock in U.S. Pat. No. 4,961,331 is used in combination with a modified steering wheel in which a cut-resistant steel cable is embedded in the wheel rim to enhance the resistance of the steering wheel to severing. The drawback of the lock of U.S. Pat. No. 4,961,333 is that it can relatively easily be cut through. As to the modification of the steering wheel itself, it can be done only by the vehicle manufacturer.

Accordingly, an important object of the present invention is to provide a portable steering wheel lock which does not have the drawbacks of the prior art devices.

Another object of the invention is to provide a steering wheel lock which is compact, relatively lightweight lock so that it is easy to carry and not only constrains a steering wheel from unauthorized steering but also reliably prevents the steering wheel from being cut through, without needing factory modification of the steering wheel.

Yet another object of the present invention is to provide a steering wheel lock which can quickly and easily be mounted on the wheel and easily removed when the vehicle is to be operated.

SUMMARY OF THE INVENTION

These and other objects of the invention, which will become apparent hereinafter, are achieved by providing a flexible steering wheel gripper formed of a plurality of metal arcunto links, pivotally connected with each other, with an elongate member attached to a middle link and with cooperating, self-locking members provided at the end links. The links are preferably made of tempered steel, having a thickness of about from $\frac{1}{8}$ to $\frac{1}{4}''$. The elongate body can be made of metal or hard plastic.

With the gripper being mounted on the steering wheel, it is impossible to rotate the steering wheel more than a small amount, as either the driver's seat or the windshield would prevent, upon being contacted by the elongate member, further rotation of the steering wheel. It is impossible to remove the gripper from the steering wheel in a relatively short period of time, as it is very difficult to sever the gripper which, as already indicated above, is made of a tempered steel, and it is even more difficult to cut off the lock.

Further, the gripper according to the present invention is very compact and can fit in a glove compartment of a vehicle. It is also lightweight, as it is made not as a solid body but of separate plate links.

The mounting and dismounting of the gripper is very easy. The standard lock, which is used with the gripper, makes it is easy to close the lock. The lock opens by a simple turn of the key. With the gripper according to the present invention, high security standard locks, e.g., locks of models produced by, for instance, Chicago Lock Co. can be used.

BRIEF DESCRIPTION OF THE DRAWINGS

The objects and features of the present invention will become more apparent and the invention itself will be best understood from the following Detailed Description of the Preferred Embodiment, when read with reference to the accompanying drawings, wherein.

DETAILED DESCRIPTION OF THE PREFERRED EMBODIMENT

Figure 1:
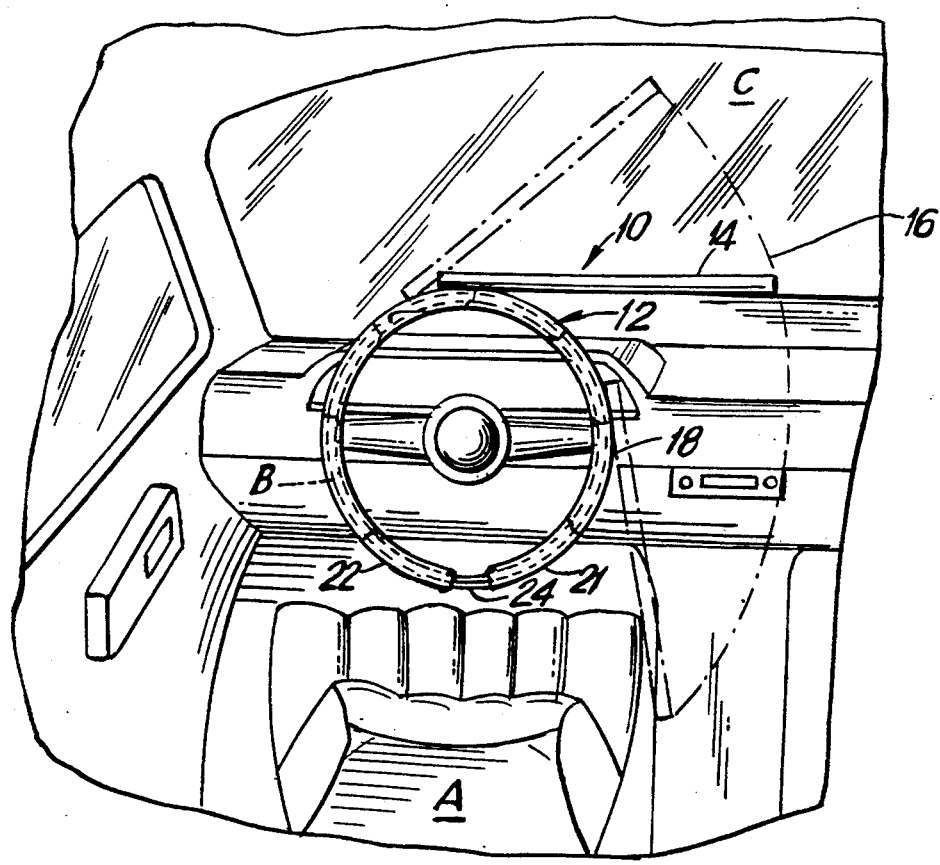
FIG. 1 is a perspective view of a portion of the interior of a motor vehicle in the region of the driver's seat, showing a steering wheel with a steering wheel gripper according to the present invention.

Referring now to the drawings, wherein like numerals reflect like elements, throughout the various views, FIG. 1 shows a portion of an interior of a passenger compartment of a motor vehicle in the region of driver's seat "A". A steering wheel gripper 10 is mounted on the steering wheel "B". The gripper 10 comprises a flexible, multi-link member 12, mounted on the steering wheel "B" and an elongate member 14, which is secured to the multi-link member 12 and extends, in the view shown in FIG. 1, substantially horizontally in a direction away from the driver's side vehicle door.

Of course, the gripper 10 can be mounted on the steering wheel so that the elongate member 14 would extend in the opposite direction, toward the driver's side vehicle door.

As known, the elongate member 14 constrains the rotation of the steering wheel "B" to a limited angle, which is defined by an arc, along which the free end of the elongate member moves, until it contacts elements of the vehicle structure which are fixed to the vehicle frame. As shown in FIG. 1, the steering wheel can move about an angle which is defined by an arc 16, along which the free end of the elongate member 14 moves until it contacts the driver's seat "A" or the windshield "C". The elongate member 14 may be painted by bright, luminous paint, so it can be also visible at night, warning a would-be thief that the vehicle would be difficult, if not impossible, to steal.

Figure 2:
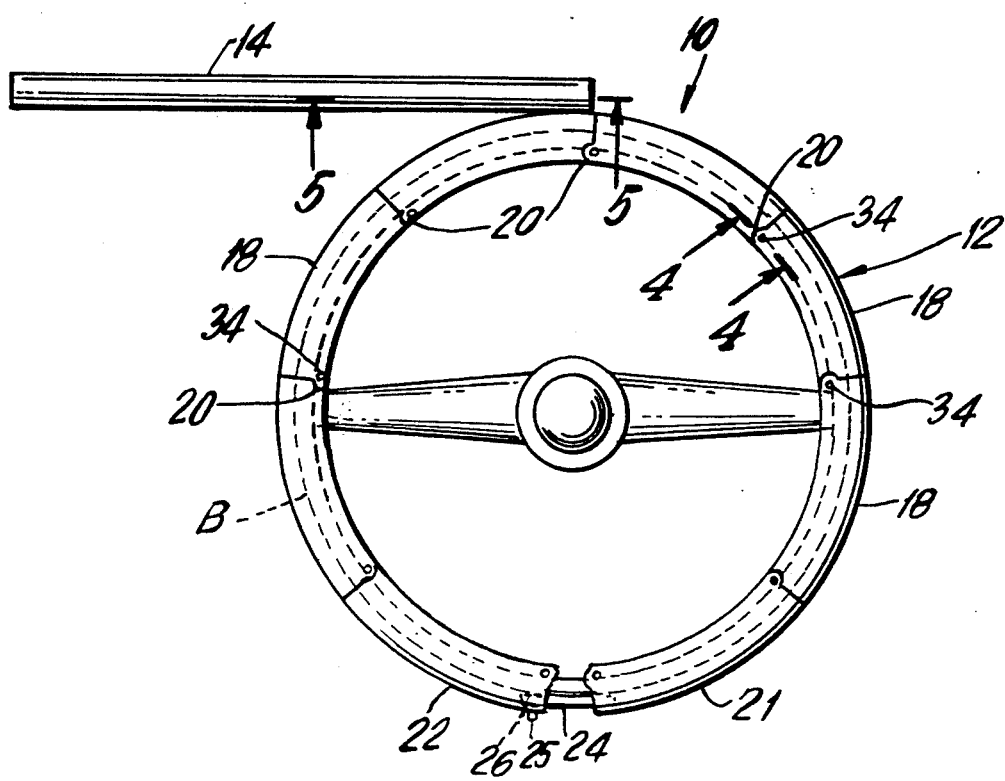
FIG. 2 is a front elevational view of the steering wheel gripper.

As shown in FIG. 2, the multi-link member 12 of the gripper 10 is formed of a plurality of individual arcuate links 18, which are pivotally attached to each other at their ears 20. The end links 20 and 22 have female and male members 24 and 26 of the locking device fixedly secured thereto, respectively. the locking members 24 and 26 are shown in FIG. 2 in an unlocked condition.

Figure 3:
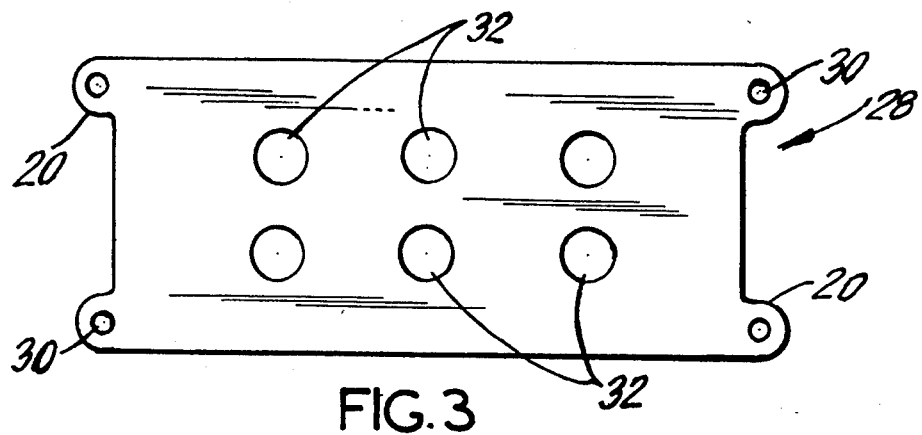
FIG. 3 is a top view of a blank from which individual links are made.

FIG. 3 shows a blank 28, from which an individual link 18 is made. The blank 28 is stamped from a band steel. As shown in FIG. 3, the blank is stamped with ears 20, having orifices 30 formed therein, to enable connection of the individual links with each other. The blank 28 is provided with a plurality of relief opening 32 for reducing the weight of each link 18 and thereby of the whole gripper. In FIG. 3, the relief orifices are shown as being circular but generally they can be of any desired shape. The width of the blanks 28 is so selected that the links, after bending, have an arc of about 270°. The blanks 28 are bent to an appropriate form in a special die so that they have a truncated conical surface. As seen in FIG. 2, each link 18 has its ears 20 at the wider side thereof, overlying the ears 20 of the adjacent link 18 which are located at the narrow side of the link.

Figure 4:
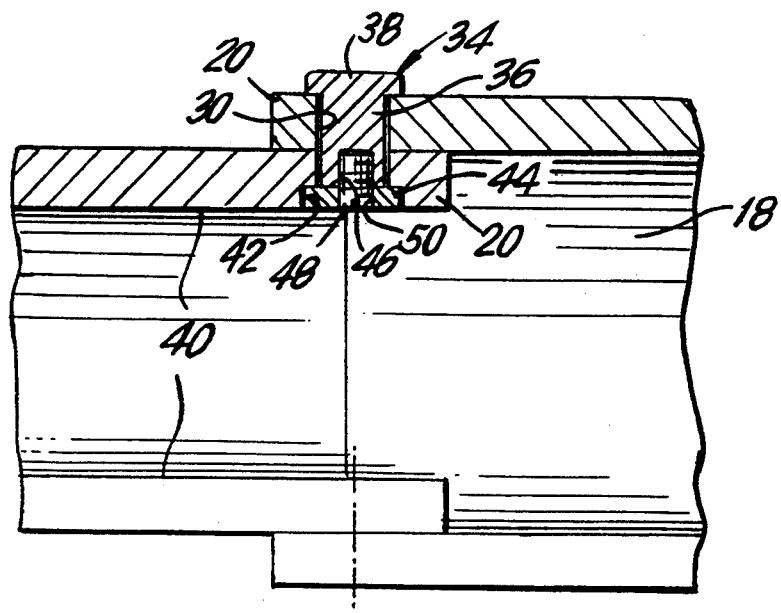
FIG. 4 is an enlarged, cross-sectional view along line IV—IV in FIG. 2.

The pivotal connection of links 18 with each other is shown in detail in FIG. 4. The ears 20 of adjacent links 18 are connected with pins 34 which extend through openings 30 of opposite pairs of ears 20 of the adjacent links 18, as shown in FIG. 4. The pin body 36 extends through openings 20, with a sliding fit which permits pivotal movement of the links relative to each other. The pin head 38 has a disc-like shape, so that it does not interfere with pivotal movement of the outer link, with regard to view shown in FIG. 4. The narrow end of the link 18 has, on its inner surface 40, a recess 42 into which a disc-shaped washer 44 is pieced, to connect the ears 20 of the adjacent link 18 to each other. The pin body 36, has an inner threaded opening 46 into which a headless screw 48 extends. The washer 44 is likewise provided with a threaded central opening 50 which is engaged by the screw 48. The foregoing arrangement provides for reliable pivotal movements of links 18 relative to each other. The described arrangement is provided by way of example only, and another type of pivot arrangement can be employed.

Figure 5:
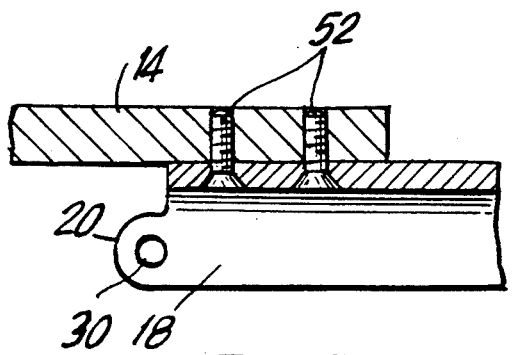
FIG. 5 in an enlarged, cross-sectional view along line V—V in FIG. 2.

The connection of the elongate member 14 to a respective link is shown in FIG. 5. The elongate member 14, is connected to the link, e.g., by two screws 52. Of course, any other appropriate means can be used for fixedly connecting the elongate member 14 with the respective link.

Figure 6:
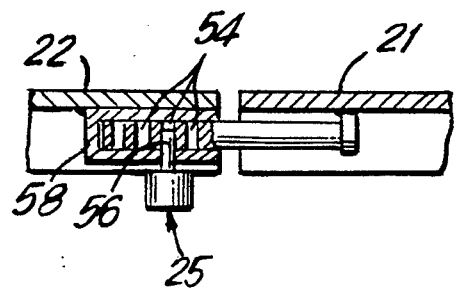
FIG. 6 is a cross-sectional view of a lock arrangement used in the gripper according to the present invention.

The lock for closing the multilink member 12 over the steering wheel "B" is shown in FIG. 6. As discussed already above, a standard high security lock is used with the gripper. As shown in FIG. 6, the female member 26, which is fixedly attached to the end link 20 by, e.g., welding, is a strip with a plurality of openings 54 adapted to receive the pin 56 of the lock 25, which is secured to the end link 22. The strip 24 is also made of a tempered steel, providing a plurality of openings in the strip permits to compensate for the difference in steering wheel sizes. Also mounted on the end link 22, is a guide member 58 for the strip 24. Upon mounting of the gripper on the steering wheel, the strip 24 is inserted into the guide 58, displacing with its free end, the pin 56 of the lock 25. The pin 56 then engages a respective opening 54, so that the gripper 10 is securely mounted on the steering wheel. To remove the gripper, the lock is opened by a key which can be kept together with other vehicle keys and the strip 24 is withdrawn so that the gripper can be taken off the steering wheel.

While the present invention has been shown and described with reference to a specific embodiment, various modifications thereof will be apparent to those skilled in the art and, therefore, it is not intended that the invention be limited to the disclosed embodiment or to the details thereof and departures may be made therefrom within the spirit and scope of appended claims.

What is claimed is:

1. A steering wheel gripper for preventing unauthorized steering of a motor vehicle, said steering wheel gripper comprising:

a flexible, multi-link member for circumscribing a rim of a steering wheel along substantially an entire perimeter of the rim and including a plurality of separate hollow links having an arcuate cross-section to conform to the rim, formed of a rigid, hard-to-sever material and connected in series one to another, and pivot means for pivotally connecting adjacent separate links to each other, said multi-link member having opposite end links connectable to each other for securing the gripper on the steering wheel;

an elongate member, fixedly connected to a link located intermediate the end links, extending in a longitudinal direction of the intermediate link, the elongate member having a length such that, in the mounted condition of the gripper, the elongate member limits rotation of the steering wheel upon contact with a respective fixed part of the motor vehicle, which is located in a region of the driver's seat of the motor vehicle; and lock means for securing the end links to each other.

2. A steering wheel gripper as set forth in claim 1, wherein each link has opposite spaced longitudinal and opposite transverse sides and a pair of opposite ears at each of the transverse sides connectable with a pair of ears of an adjacent transverse side of an adjacent link for forming the multi-link member.

3. A steering wheel gripper as set forth in claim 2, wherein said pivot means comprises a plurality of pins having a threaded opening and extending through overlapping pairs of ears of adjacent sides of adjacent links, and a plurality of screws extending into said threaded openings, respectively, for connecting the adjacent sides of the adjacent links together to form the multi-link member.

4. A steering wheel gripper as set forth in claim 1, wherein the links are formed of tempered steel.

5. A steering wheel gripper as set forth in claim 1, wherein said lock means comprises self locking male and female members attached respectively to the end links of the multi-link member.

* * * * *